United States Patent [19]
Bryant et al.

[11] Patent Number: 5,802,415
[45] Date of Patent: Sep. 1, 1998

[54] DUAL COIL ACTUATOR

[75] Inventors: Robert C. Bryant, Honeoye Falls; Michael J. O'Brien, Rochester; Edward P. Furlani, Lancaster, all of N.Y.

[73] Assignee: Eastman Kodak Company, Rochester, N.Y.

[21] Appl. No.: 834,973

[22] Filed: Apr. 7, 1997

[51] Int. Cl.[6] ............................................. G03B 9/08
[52] U.S. Cl. ............................ 396/469; 396/501; 310/22
[58] Field of Search .................... 396/463, 469–496, 396/501, 471; 310/13, 22, 27, 33

[56] References Cited

U.S. PATENT DOCUMENTS

| | | |
|---|---|---|
| 3,956,761 | 5/1976 | Koch et al. .......................... 396/496 |
| 4,033,693 | 7/1977 | Payrhammer et al. . |
| 4,268,153 | 5/1981 | Sugiura . |
| 4,623,233 | 11/1986 | Yamada et al. . |
| 4,839,679 | 6/1989 | Cameron et al. . |

*Primary Examiner*—David M. Gray
*Attorney, Agent, or Firm*—Roger A. Fields

[57] ABSTRACT

A dual coil actuator comprising a pair of independently moveable electrically conductive coils, is characterized in that a single magnet core generates a single magnetic field, and the coils are positioned around the single magnet core, spaced from each other and from the core, and are supported to be independently moved in the single magnetic field about the single magnet core.

8 Claims, 7 Drawing Sheets

DUAL COIL ACTUATOR

FIELD OF THE INVENTION

The invention relates generally to the field of electromagnetic actuators, and in particular to a dual coil actuator.

BACKGROUND OF THE INVENTION

It is generally known for a dual coil actuator to comprise a pair of electrically conductive coils independently rotatable about a common axis in different magnetic fields. The magnetic fields are effected by separate permanent magnets or separate electromagnets.

One short coming of this kind of actuator is that the separate permanent magnets or separate electromagnets adds to the cost, complexity and space-requirements of the actuator.

Another shortcoming of this kind of actuator is that the independent rotation of the two coils cannot be precisely matched, because of the different magnetic fields, without the use of a separate feedback control.

SUMMARY OF THE INVENTION

A dual coil actuator comprising a pair of independently moveable electrically conductive coils, is characterized in that:

a single magnet core generates a single magnetic field; and the coils are positioned around the single magnet core, spaced from each other and from the core, and are supported to be independently moved in the single magnetic field about the single magnet core.

Since there is only one magnet core, a reduction in cost, complexity and space is achieved.

Since the coils are supported to be moved in only one magnetic field, there movement can be precisely matched without the use of a separate feedback control.

DETAILED DESCRIPTION OF THE INVENTION

Figure 1:
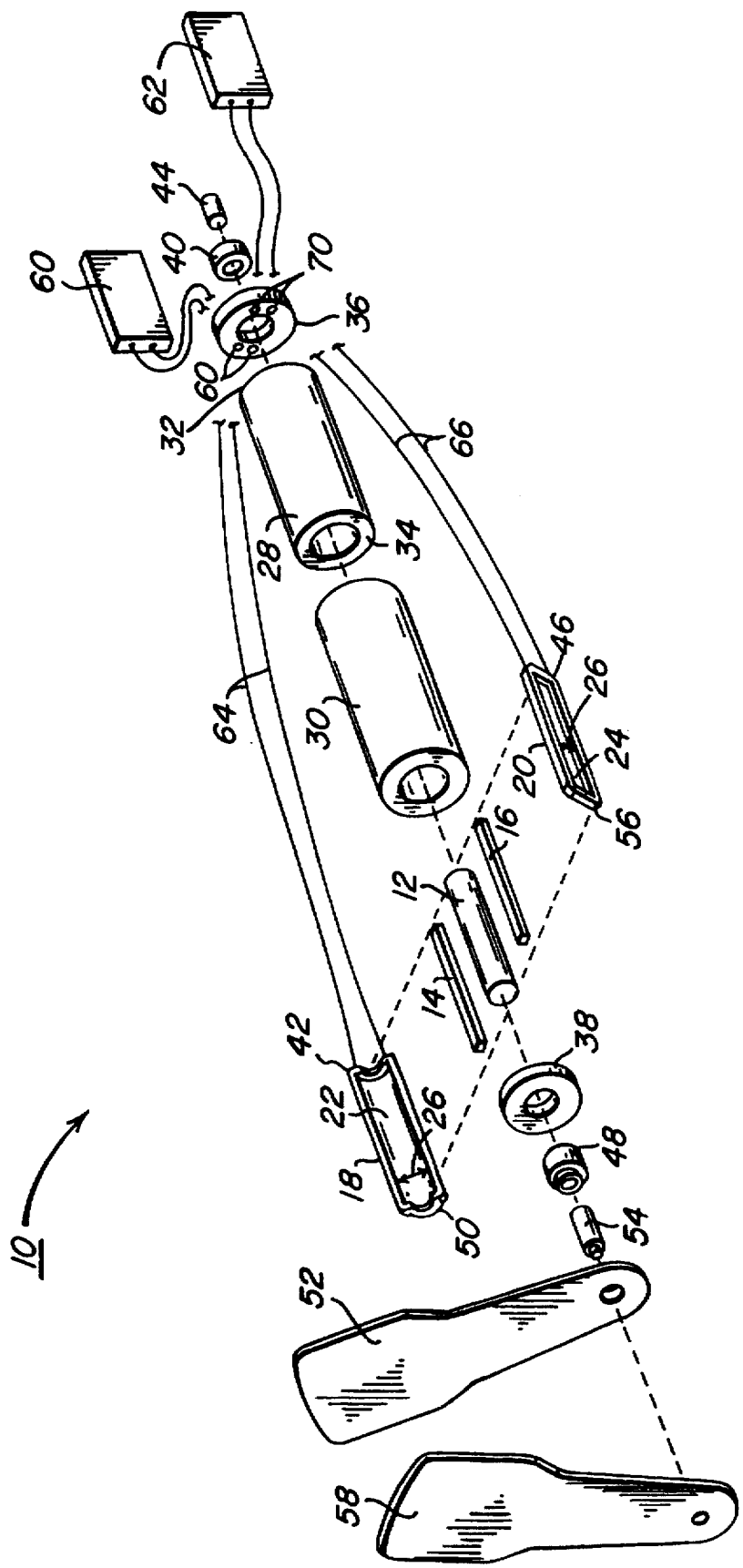
FIG. 1 is an exploded perspective view of a dual coil actuator according to a preferred embodiment of the invention.
Figure 2:
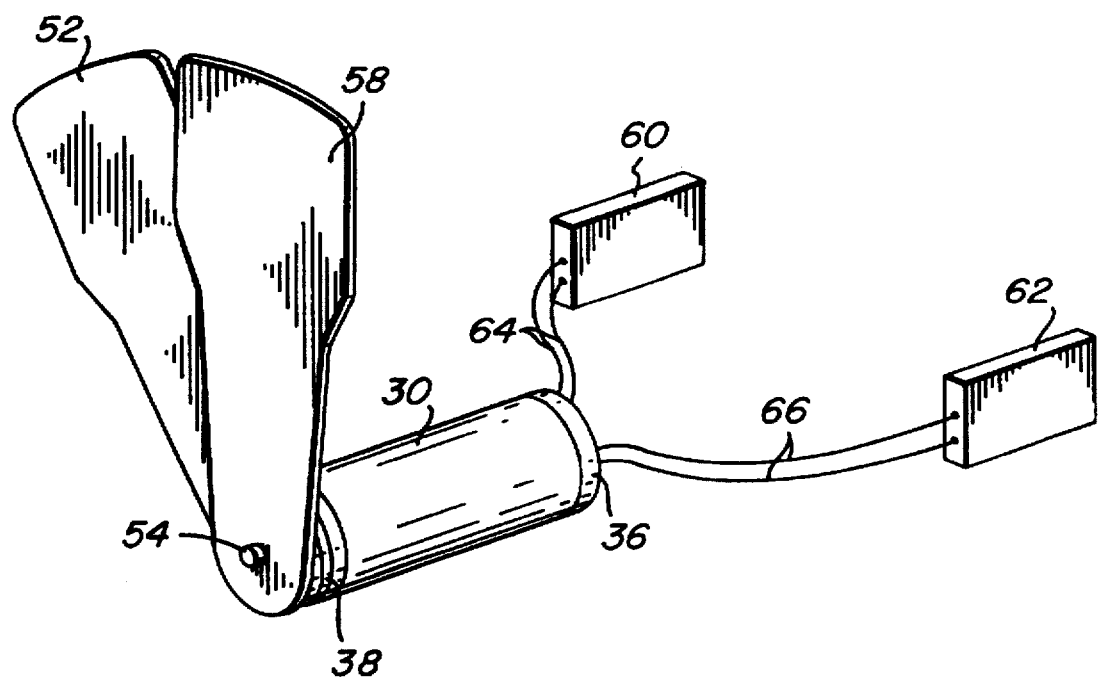
FIG. 2 is an assembled perspective view of the dual coil actuator.

The invention is disclosed as being embodied preferably in a dual coil actuator. Because the features of a dual coil actuator are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–6 show a dual coil actuator 10 according to a preferred embodiment of the invention..

Figure 3:
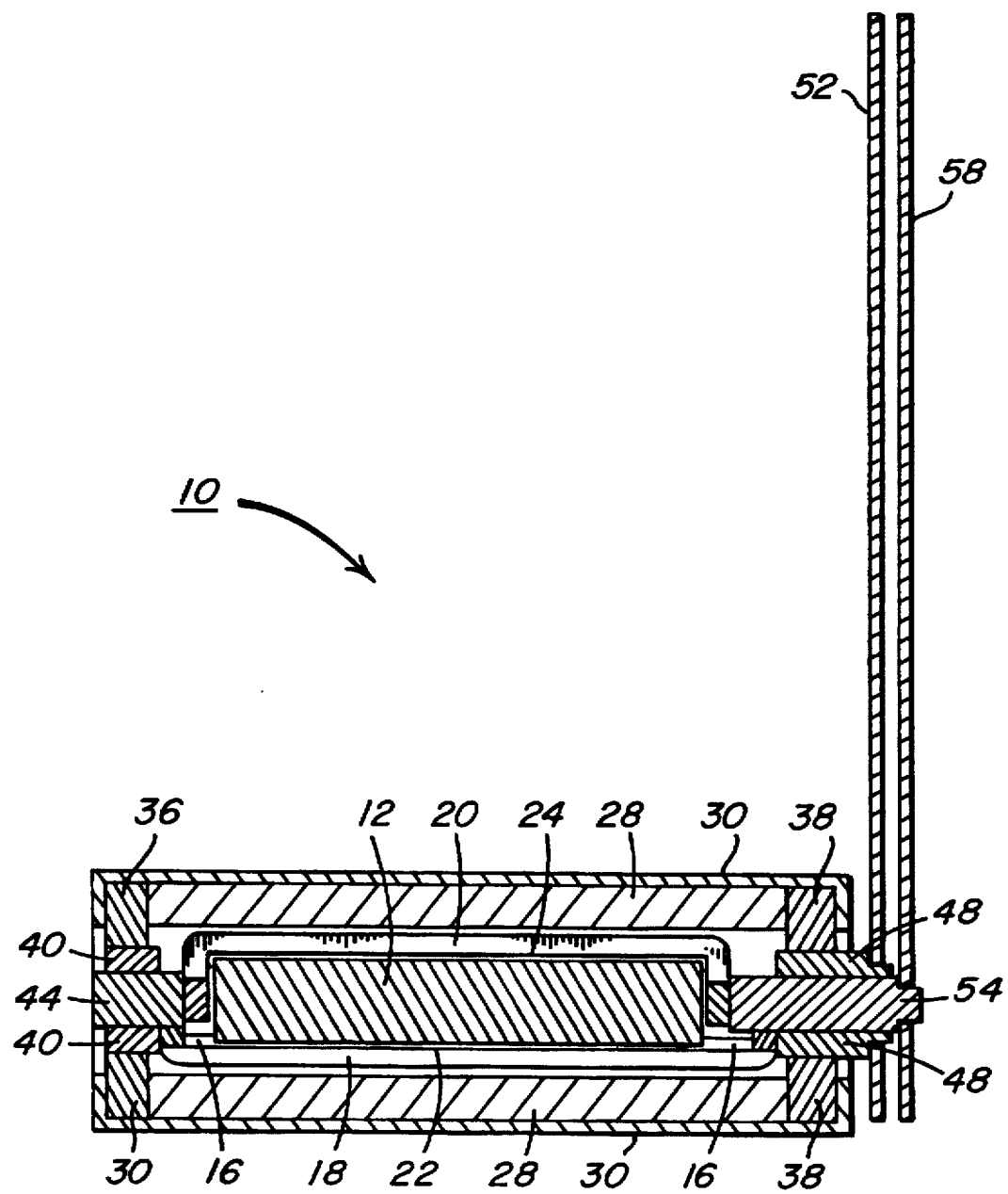
FIG. 3 is a longitudinal section view of the dual coil actuator.
Figure 4:
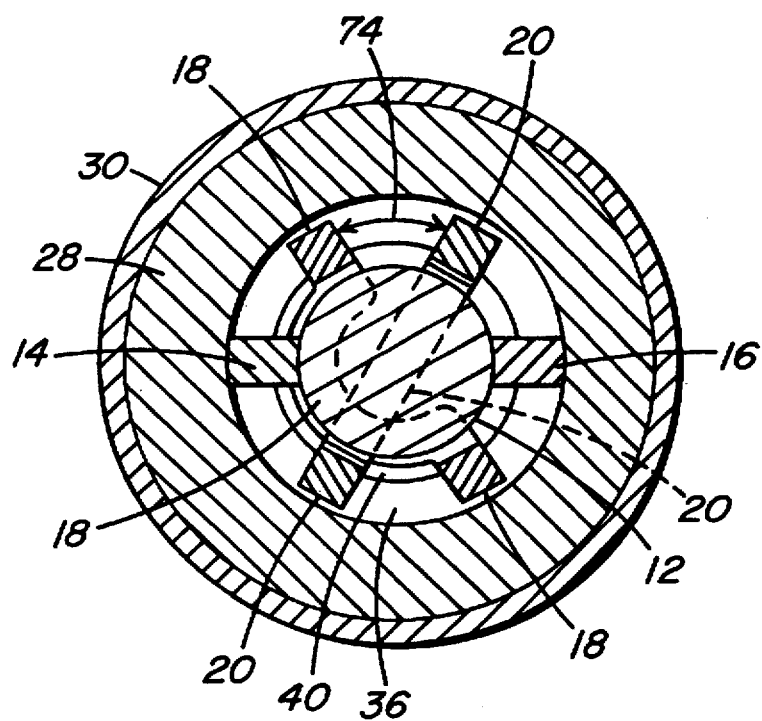
FIG. 4 is a cross-section view of the dual coil actuator.
Figure 5:
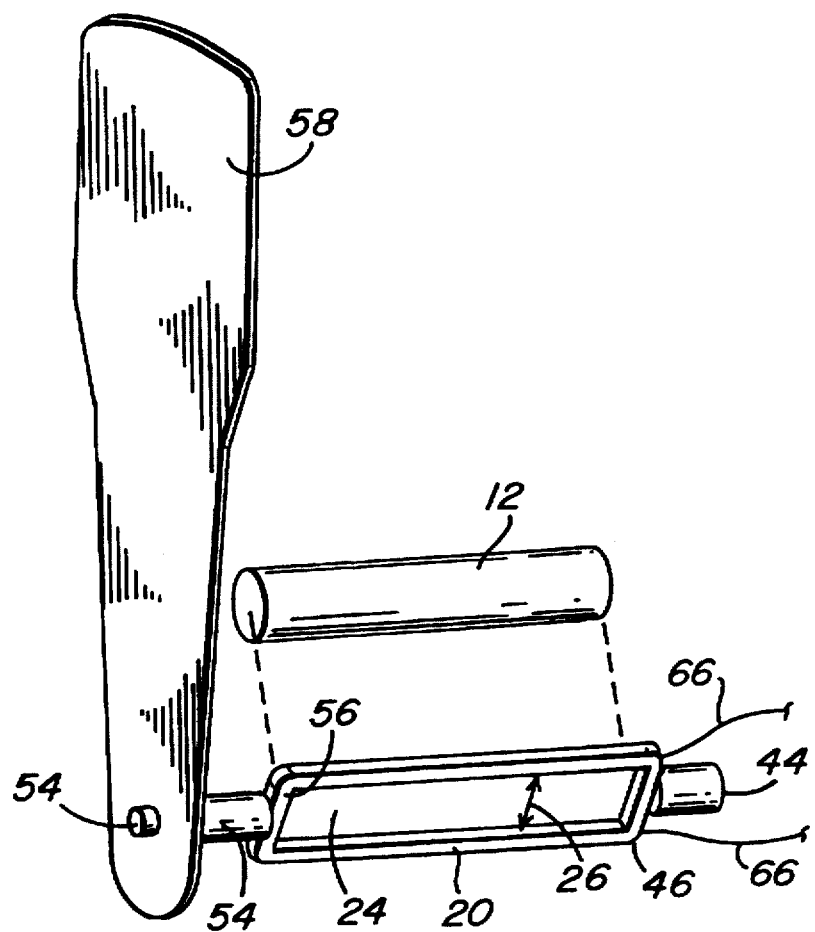
FIGS. 5 and 6 are partially-exploded perspective views of respective independently movable wire coils, a pair of shutter opening and closing blades and a common magnet core, of the dual coil actuator.
Figure 6:
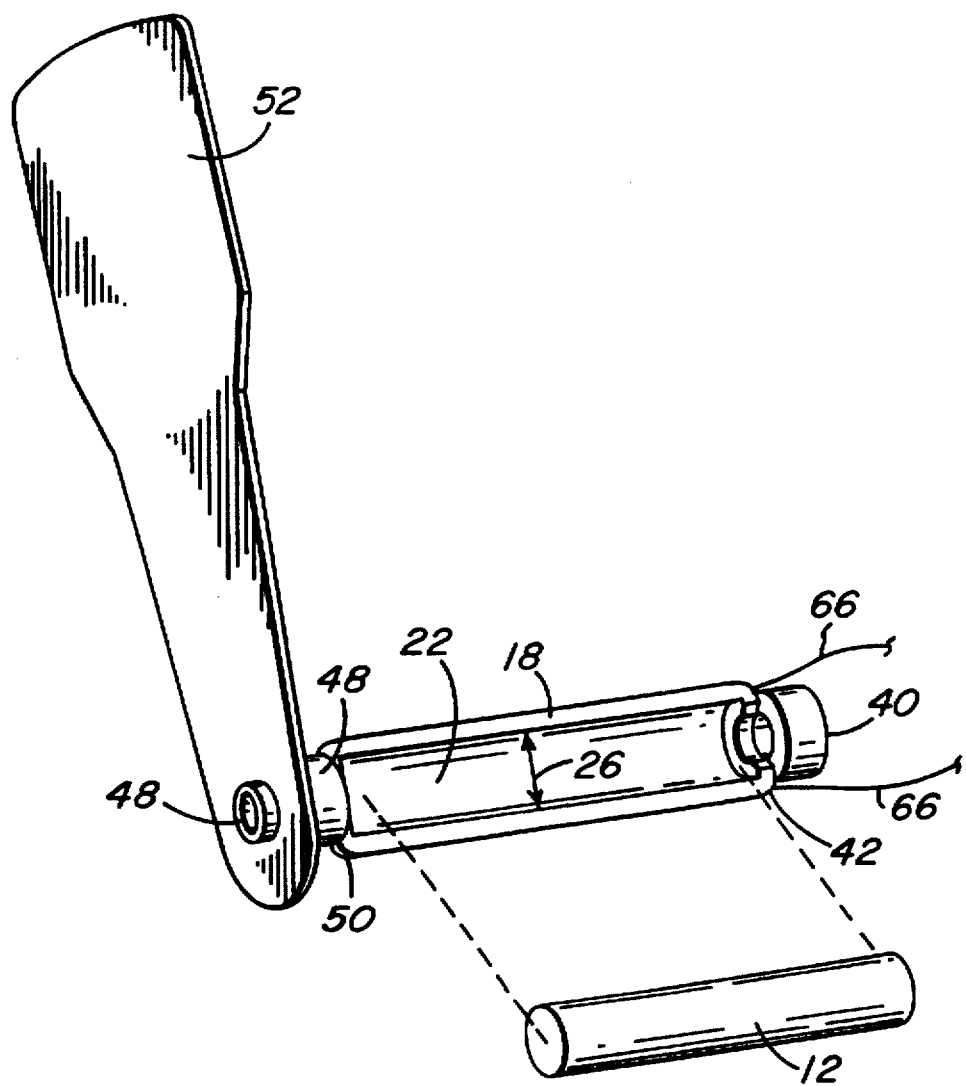

Beginning at the center of the actuator 10, FIGS. 1, 3 and 4 depict a single, stationary, cylindrical, permanent magnet core 12. The magnet core 12 is polarized widthwise, rather than lengthwise, and may be neodymium-iron-boron. A pair of non-magnetic, electrically non-conductive spacers 14 and 16 are attached 180 degrees apart from each other to the single magnet core 12 to be stationary with the magnet core. A pair of rectangular copper-wire coils 18 and 20 have respective rectangular air gaps 22 and 24. As shown in FIGS. 4, 5 and 6, the single magnet core 12 is positioned longitudinally within the two air gaps 22 and 24. The two air gaps 22 and 24 have a similar minor dimension 26 that constitutes the width of each one of the air gaps. The dimension 26 is greater than the diameter of the single magnet core 12. A stationary, single flux return sleeve 28 completely encircles the single magnet core 12, the two spacers 14 and 16 and the two wire coils 18 and 20. The flux return sleeve 28 is annealed carbon steel. The two spacers 14 and 16 are attached to the flux return sleeve 28 to hold the flux return sleeve stationary relative to the single magnet core 12. See FIG. 4.

The flux return sleeve 28 is secured within a non-magnetic, electrically non-conductive housing 30 and is fixed at its opposite ends 32 and 34 to respective aligned, non-magnetic, electrically non-conductive bearing sleeves 36 and 38. The bearing sleeve 36 rotatably supports a non-magnetic, electrically non-conductive support sleeve 40 that is coaxially fixed to one end 42 of the wire coil 18. The support sleeve 40 rotatably supports a non-magnetic, electrically non-conductive support pin 44 that is coaxially fixed to one end 46 of the wire coil 20. The bearing sleeve 38 rotatably supports a non-magnetic, electrically non-conductive drive sleeve 48 that is coaxially fixed to another end 50 of the wire coil 18 and to a non-magnetic, electrically non-conductive closing shutter blade 52. The drive sleeve 48 rotatably supports a non-magnetic, electrically non-conductive drive pin 54 that is coaxially fixed to another end 56 of the wire coil 20 and to a non-magnetic, electrically non-conductive shutter opening blade 58. The shutter closing and opening blades 52 and 58 are substantially identical, including their weight and size. As shown in FIG. 1, respective known actuating circuits 60 and 62 are connected via two pairs of wire leads 64, 64 and 66, 66 through separate pairs of holes 68, 68 and 70, 70 in the bearing sleeve 36 to the ends 42 and 46 of the two wire coils 18 and 20.

In essence, the wire coil 20 is supported at the support and drive pins 44 and 54 and the wire coil 18 is supported at the support and drive sleeves 40 and 48 for successive independent rotation in the same direction coaxially in the same magnetic field about the single magnet core 12. See FIGS. 1, 3, 5 and 6.

As indicated in FIG. 4, the two wire coils 18 and 20 have a minimum angular separation 74 of about 60 degrees. However, the minimum angular separation 74 can be at least 10 degrees and at most 90 degrees.

Figure 7:
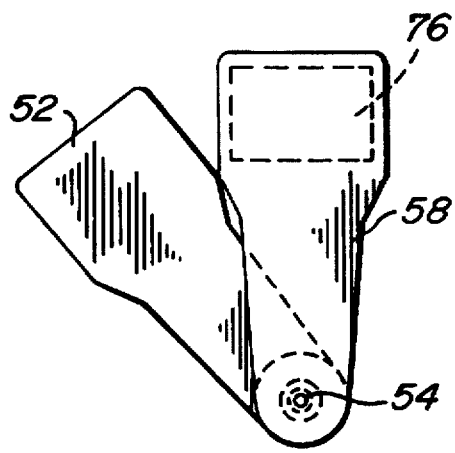
FIGS. 7, 8 and 9 are elevation views of the shutter opening and closing blades, depicting their opening and closing movements.
Figure 8:
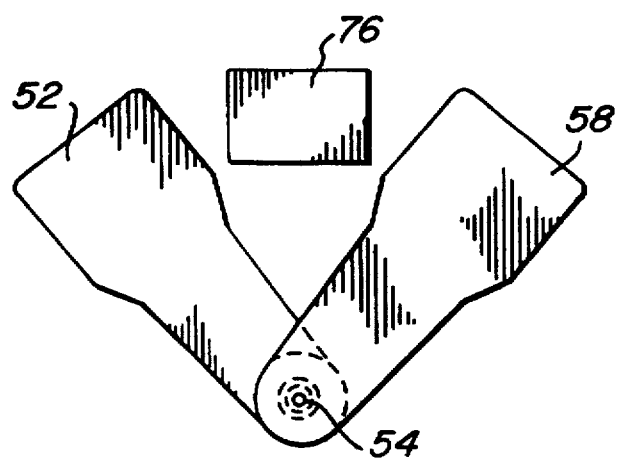
Figure 9:
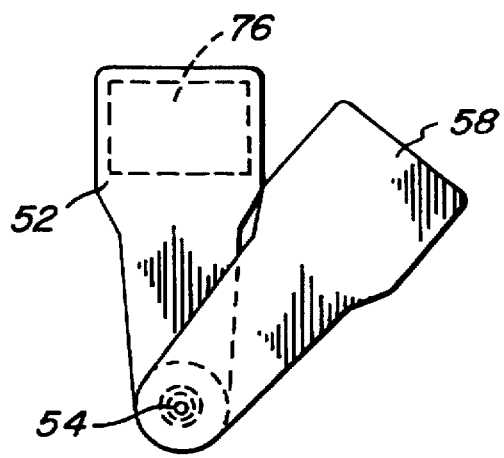

Operation (FIGS. 7–9)

One sequence of operation is as follows:

(1) When the actuating circuit 60 is energized, the magnetic field causes the wire coil 20 to rotate clockwise in FIG. 1 about the magnet core 12 to similarly rotate the drive pin 54 and, in turn, swing the shutter opening blade 58 from its starting position shown in FIG. 7 to uncover an aperture 76 as shown in FIG. 8. Then, the actuating circuit 60 is de-energized to leave the shutter opening blade 58 in its new position as shown in FIG. 8.

(2) When the actuating circuit 62 is energized, following de-energization of the actuating circuit 60, the magnetic field causes the wire coil 18 to rotate clockwise in FIG. 1 about the magnet core 12 to similarly rotate the drive sleeve 48 and, in turn, swing the shutter closing blade 52 from its starting position shown in FIGS. 7 and 8 to re-cover the aperture 76 as shown in FIG. 9. Then, the actuating circuit 62 is de-energized to leave the shutter closing blade 58 in its new position as shown in FIG. 9.

The next sequence of operation is as follows:

(1) When the actuating circuit 62 is energized, the magnetic field causes the wire coil 18 to rotate counter-clockwise in FIG. 1 about the magnet core 12 to similarly rotate the drive sleeve 48 and, in turn, swing the shutter blade 52 (which now functions as an opening blade) from its starting position shown in FIG. 9 to uncover the aperture 76 as shown in FIG. 8. Then, the actuating circuit 62 is de-energized to leave the shutter blade 58 in its new position as shown in FIG. 8.

(2) When the actuating circuit 60 is energized, following de-energization of the actuating circuit 62, the magnetic field causes the wire coil 20 to rotate counter-clockwise in FIG. 1 about the magnet core 12 to similarly rotate the drive pin 54 and, in turn, swing the shutter blade 58 (which now functions as a closing blade) from its starting position shown in FIGS. 8 and 9 to re-cover then aperture 76 as shown in FIG. 7. Then, the actuating circuit 60 is de-energized to leave the shutter blade 58 in its new position as shown in FIG. 7.

The next sequence of operation is the same as the first-mentioned one. The alternating direction of rotation in each successive sequence of operation is effected by reversing the current direction in the two actuating circuits 60 and 62.

The invention has been described with reference to a preferred embodiment. However, it will be appreciated that variations and modifications can be effected by a person of ordinary skill in the art without departing from the scope of the invention. For example, the magnet core 12 rather than being a permanent magnet can be an electromagnet.

PARTS LIST 10. dual coil actuator
12. single magnet core
14. spacer
16. spacer
18. wire coil
20. wire coil
22. air gap
24. air gap
26. minor dimension
28. single flux return sleeve
30. housing
32. sleeve end
34. sleeve end
36. bearing sleeve
38. bearing sleeve
40. support sleeve
42. coil end
44. support pin
46. coil end
48. drive sleeve
50. coil end
52. closing shutter blade
54. drive pin
56. coil end
58. shutter opening blade
60. actuating circuit
62. actuating circuit
64, 64. wire leads
66, 66. wire leads
68, 68. sleeve holes
70, 70. sleeve holes
74. minimum angular separation

What is claimed is:

1. A dual coil actuator comprising a pair of independently moveable electrically conductive coils, is characterized in that:

a single magnet core generates a single magnetic field; and said coils are positioned around said single magnet core, spaced from each other and from the core, and are supported to be independently rotated coaxially in the single magnetic field about the single magnet core.

2. A dual coil actuator as recited in claim 1, wherein said coils have a minimum angular separation of at least 10 degrees and at most 90 degrees.

3. A dual coil actuator as recited in claim 1, wherein said coils have respective air gaps, and said single magnet core is positioned within said air gaps.

4. A dual coil actuator as recited in claim 3, wherein a single flux return sleeve encircles said coils and said single magnet core.

5. A dual coil actuator as recited in claim 4, wherein respective non-magnetic spacers are attached to said single magnet core and said single flux return sleeve.

6. A dual coil actuator as recited in claim 3, wherein said air gaps of the coils have a similar minor dimension that constitues the width of each air gap.

7. A dual coil actuator as recited in claim 1, wherein an opening shutter blade is fixed coaxially to one of said coils and a closing shutter blade is fixed coaxially to the other coil.

8. A dual coil actuator as recited in claim 7, wherein respective supports initially support one of said shutter blades to first be moved in a forward direction to uncover an aperture and the other shutter blade to then be moved to re-cover the aperture, and then supports said other blade to first be moved in a reverse direction to uncover the aperture and said one blade to then be moved in the same direction to recover the aperture, in order that the pair of shutter blades each alternate as opening and closing blades in accordance with the direction they are moved.

* * * * *